United States Patent
Lu et al.

(10) Patent No.: US 9,299,152 B2
(45) Date of Patent: Mar. 29, 2016

(54) SYSTEMS AND METHODS FOR IMAGE DEPTH MAP GENERATION

(71) Applicant: Hong Kong Applied Science and Technology Research Institute Co., Ltd., Shatin (CN)

(72) Inventors: Wang Lu, Shenzhen (CN); Huo Yan, Shenzhen (CN); Ren Junyan, Shenzhen (CN)

(73) Assignee: Hong Kong Applied Science and Technology Research Institute Co., Ltd., Shatin (HK)

( * ) Notice: Subject to any disclaimer, the term of this patent is extended or adjusted under 35 U.S.C. 154(b) by 569 days.

(21) Appl. No.: 13/722,803

(22) Filed: Dec. 20, 2012

(65) Prior Publication Data

US 2014/0176672 A1 Jun. 26, 2014

(51) Int. Cl.
*H04N 13/00* (2006.01)
*G06T 7/00* (2006.01)

(52) U.S. Cl.
CPC ............ *G06T 7/0071* (2013.01); *G06T 7/0053* (2013.01)

(58) Field of Classification Search
CPC .. G06T 7/0071; G06T 7/0053; H04N 19/139; H04N 19/30; H04N 19/523; H04N 19/53; H04N 19/187
USPC ......................................... 375/240.01; 348/43
See application file for complete search history.

(56) References Cited

U.S. PATENT DOCUMENTS

| 2003/0202120 | A1* | 10/2003 | Mack ............................ 348/578 |
| 2005/0125368 | A1* | 6/2005 | Akahori ........................ 706/12 |
| 2011/0026808 | A1* | 2/2011 | Kim et al. ..................... 382/154 |
| 2011/0080400 | A1 | 4/2011 | Yamada |

(Continued)

FOREIGN PATENT DOCUMENTS

CN 102693552 a 9/2012

OTHER PUBLICATIONS

Office Action issued for Chinese Application No. 201310016142.2, dated Mar. 2, 2015, 13 pages with English translation.

(Continued)

*Primary Examiner* — Farzana Hossain
*Assistant Examiner* — Matthew Kwan
(74) *Attorney, Agent, or Firm* — Norton Rose Fulbright US LLP

(57) ABSTRACT

Systems and methods which provide generation of image depth maps which more accurately represent the local depth discontinuity within images through use of image global depth maps adapted based upon image global motion and/or localized depth analysis utilizing relative relationships of attributes across depth discontinuities in the image are disclosed. Embodiments utilize a full global depth map which is larger than or equal to the image being converted in order to accommodate image global motion, in generating an image global depth map. In operation according to embodiments, an image global depth map is identified within the full global depth map, such as based upon global motion within the image. Localized depth analysis, using pixel attribute relative relationships, is applied with respect to the image global depth map according to embodiments to generate an image depth map which more accurately reflects the local depth discontinuities within the image.

24 Claims, 10 Drawing Sheets

(56) References Cited

U.S. PATENT DOCUMENTS

| | | |
|---|---|---|
| 2011/0141237 A1 | 6/2011 | Cheng et al. |
| 2011/0188773 A1 | 8/2011 | Wei et al. |
| 2011/0210969 A1 | 9/2011 | Barenbrug |
| 2012/0105602 A1* | 5/2012 | McNamer et al. .............. 348/50 |
| 2012/0127270 A1* | 5/2012 | Zhang et al. ................... 348/43 |
| 2012/0308203 A1* | 12/2012 | Matsudo ...................... 386/241 |
| 2013/0088614 A1* | 4/2013 | Lee .......................... 348/223.1 |

OTHER PUBLICATIONS

Zhuandi, et al. System of 2D-to-3D Video Auto-Conversion Based on OMAP3530, Journal of Data Acquisitions & Processing. vol. 27, No. 6, Nov. 2012, 7 pages.

Wei, et al., A 2D-3D Video Conversion Method Based on Layer Optimization and Integration, Journal of Computer-Aided Design & Computer Graphics, vol. 24, No. 11, Nov. 2012, 16 pages.

\* cited by examiner

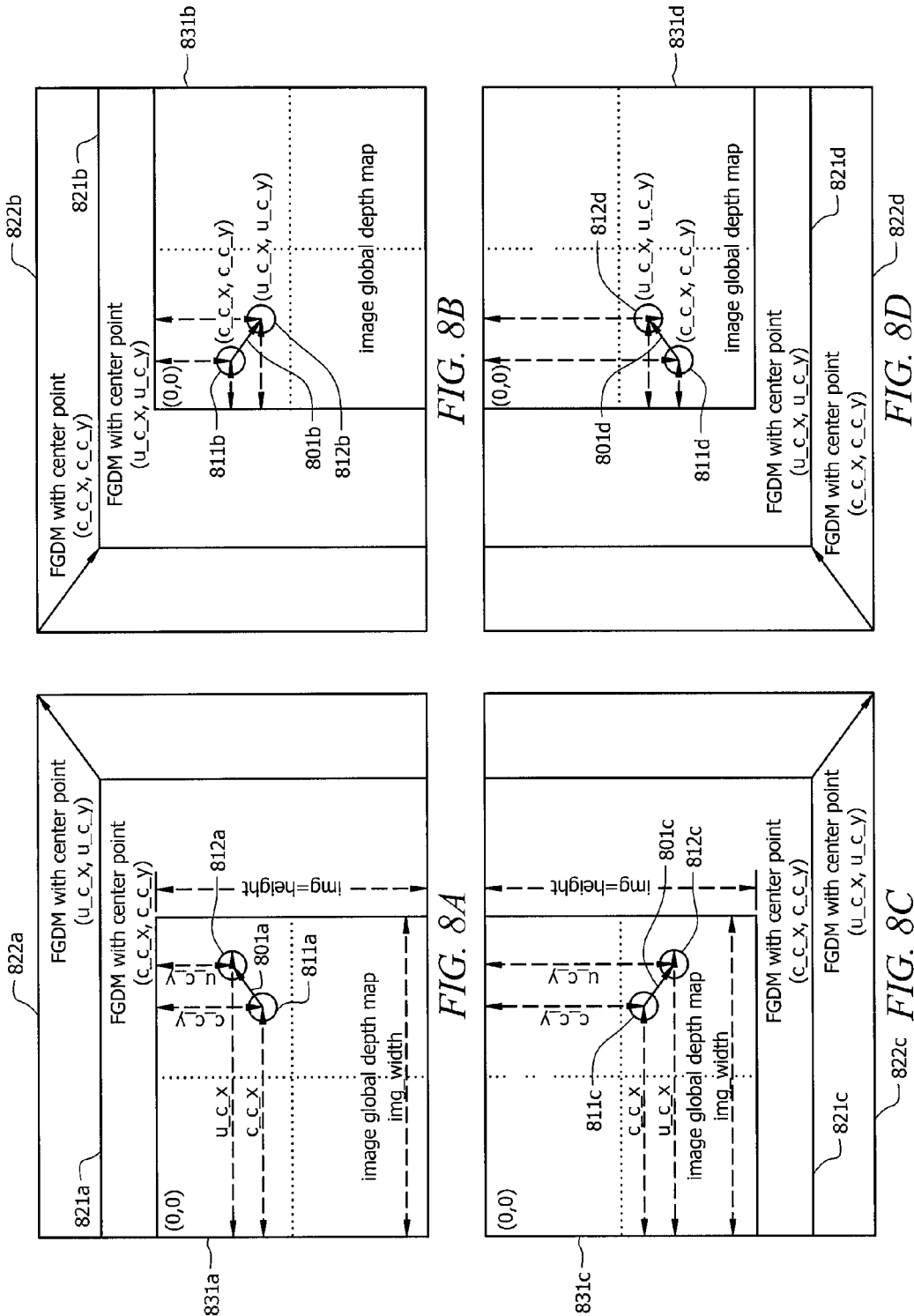

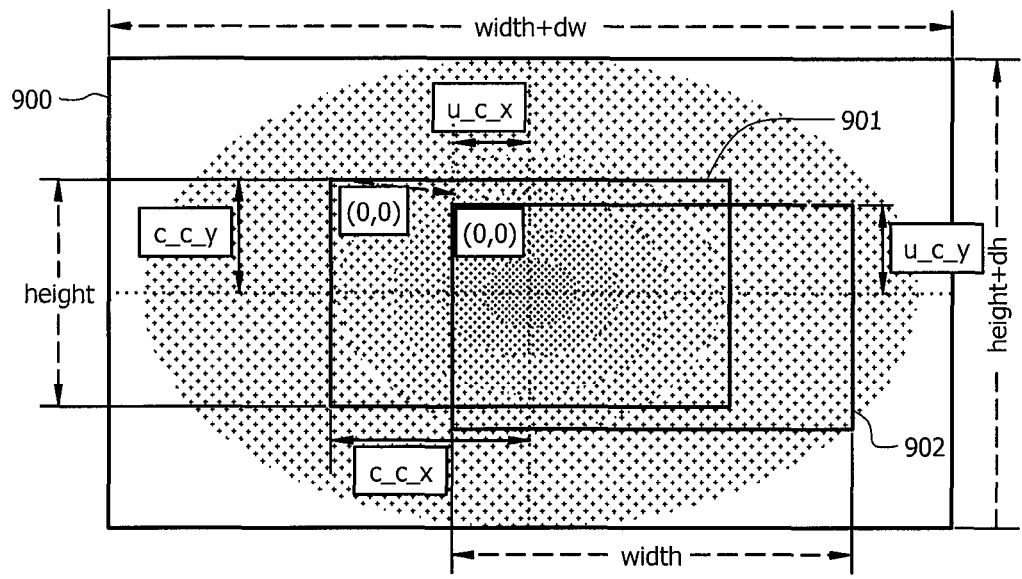
*FIG. 9A*
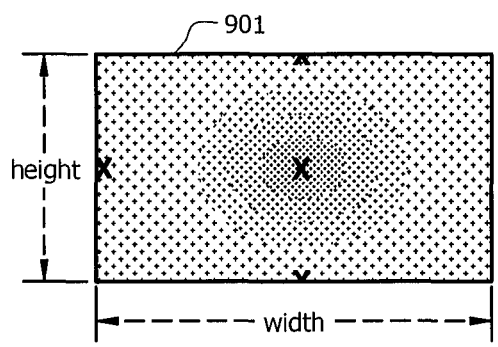 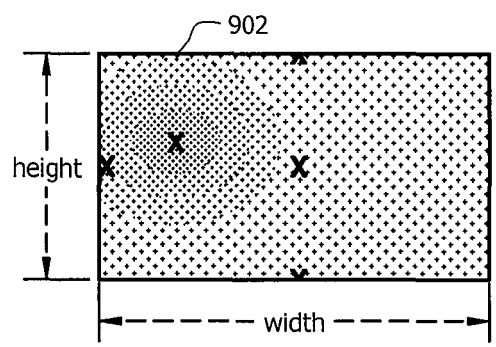
*FIG. 9B*          *FIG. 9C*

SYSTEMS AND METHODS FOR IMAGE DEPTH MAP GENERATION

TECHNICAL FIELD

The invention relates generally to image processing and, more particularly, to generation of depth maps, such as for use in rendering three-dimensional images from two-dimensional images.

BACKGROUND OF THE INVENTION

With the development of improved three-dimensional (3D) projection technologies, as used in theatres, amusement rides, etc., and the more recent introduction of 3D television sets, the demand for 3D image content is rapidly increasing. Accordingly, there has been considerable interest in converting 2D images (e.g., feature length movies, television shows, etc.) captured using mono-view devices into 3D images.

Some of the conventional mono-view 2D-to-3D conversion techniques utilize computer vision based technologies, such as segmentation, vanishing line detection, etc. Likewise, some mono-view 2D-to-3D conversion techniques utilize motion information, such as to capture content obscured by an object moving in the foreground. These technologies, however, are generally not practical for real time 2D-to-3D conversion. In particular, such computer vision based technologies require significant computing resources and are not well suited either for real time operation or for low cost applications.

Other techniques used to convert 2D images to 3D images generate a depth map (i.e., an image or image channel that contains information relating to the distance of the surfaces of scene objects from a viewpoint), then use the depth map to create the left and right view (i.e., parallax views) from the image in accordance with the depth map. For example, various techniques utilize a global depth model and more localized depth analysis to generate a local depth map with which a 3D image may be generated. The global depth model provides a generalized depth model for the image, such as may be based on a planar model or spherical model, which does not accurately reflect the local depth discontinuity. Accordingly, more localized analysis, such as image texture analysis, is used with the global depth model to generate a local depth map for the image which more accurately reflects the local depth discontinuity.

The image depth maps generated using the foregoing global depth model and localized depth analysis techniques are often less than ideal, such as due to the use of the global depth models not dynamically representing the images to be converted and the localized depth analysis techniques used not accurately representing local depth. For example, a global depth model chosen as a central symmetric model may be used by scene analysis, wherein the model will keep central symmetry for all the frames of the scene irrespective of changes within the scene (e.g., movement or motion not rising to the level of a scene change). Likewise, local depth assignments made using typical localized depth analysis techniques are particularly inaccurate under poor light conditions.

BRIEF SUMMARY OF THE INVENTION

The present invention is directed to systems and methods which provide generation of image depth maps which more accurately represent the local depth discontinuity within images through use of image global depth maps adapted based upon image global motion and/or localized depth analysis utilizing relative relationships of attributes across depth discontinuities in the image. Accordingly, embodiments of the invention utilize a full global depth map in generating an image global depth map. Localized depth analysis, using pixel attribute relative relationships, is applied with respect to the image global depth map according to embodiments to generate an image depth map which more accurately reflects the local depth discontinuities within the image.

A full global depth map utilized according to embodiments of the invention comprises a global depth map which is larger than or equal to the image for which 2D-to-3D conversion is to be provided in order to accommodate image global motion (e.g., general movement of the image, such as due to panning and/or zooming the camera, general movement of the object groupings within the image, etc., which does not amount to a scene change). In operation according to embodiments, an image global depth map is identified within the full global depth map (e.g., a sub-region of the full global depth map), such as based upon global motion within the image. Accordingly, techniques to track image global motion may be implemented according to embodiments of the invention. For example, embodiments of the invention can change the central symmetric model through tracking the global motion of the scene of the image. Moreover, embodiments of the invention may update the depth directly based on saliency area detection.

The localized depth analysis to refine an image global depth map and provide an image depth map according to embodiments utilizes relative relationships of different color components of the various pixels. Accordingly, inaccuracies resulting from independent analysis of one or more color component, such as may be associated with poor light conditions, may be avoided according to embodiments of the invention by introducing the relative relationship of different color channels.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWING

For a more complete understanding of the present invention, reference is now made to the following descriptions taken in conjunction with the accompanying drawing, in which:

FIGS. 8A-8D illustrate operation of global depth map generation logic implementing a calculating based technique for generating a FGDM and for generating an IGDM from the FGDM according to embodiments of the invention;

FIGS. 9A-9D illustrate operation of global depth map generation logic implementing a mapping based technique for generating a FGDM and for generating an IGDM from the FGDM according to embodiments of the invention.

DETAILED DESCRIPTION OF THE INVENTION

Figure 1:
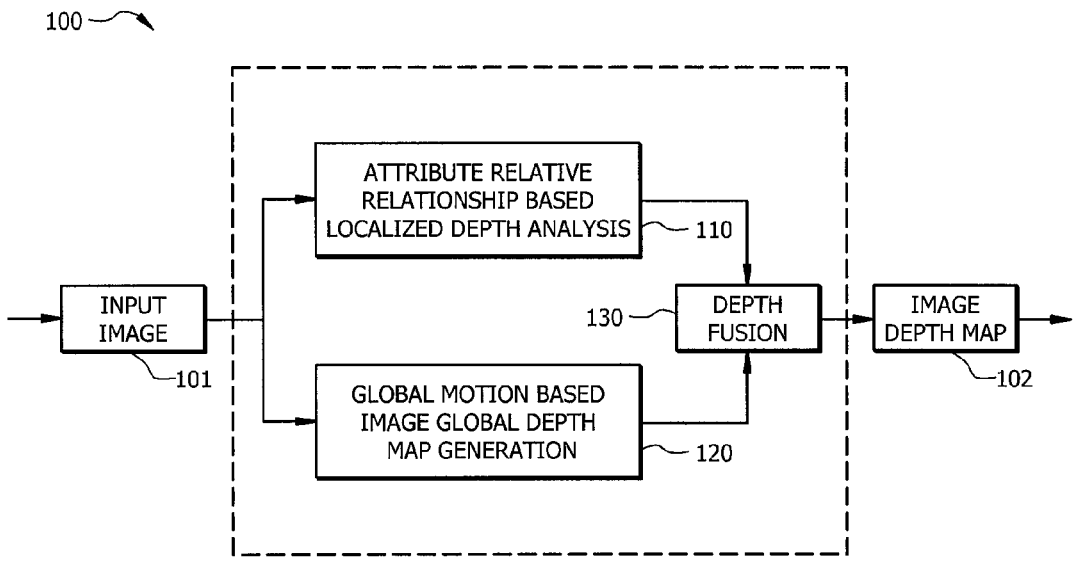
FIG. 1 shows a system adapted to provide image depth map generation according to embodiments of the invention.

FIG. 1 shows a system adapted to provide image depth map generation according to embodiments of the invention. Specifically, system 100 is adapted to accept input of image data 101 (e.g., a series of mono-view images comprising scenes from a moving video) and generate image depth map 102 (e.g., images that contain information relating to the distance of the surfaces of scene objects in the moving video from a viewpoint) for output through use of image global depth maps adapted based upon image global motion and/or localized depth analysis utilizing relative relationships of attributes across depth discontinuities in the image. Accordingly, system 100 of the illustrated embodiment comprises attribute relative relationship based localized depth analysis logic (also referred to herein as depth analysis logic) 110, global motion based image global depth map generation logic (also referred to herein as global depth map generation logic) 120, and depth fusion logic 130, as will be described in further detail below.

It should be appreciated that the foregoing logic may be implemented in various ways, including hardware logic circuits, software, firmware, and combinations thereof. When implemented in software, elements of embodiments of the present invention may comprise code segments operable upon a processor-based system, such as computer system 200 of FIG. 2, to perform the tasks described herein. The code segments can be stored in a computer readable medium, such as random access memory (RAM) 203, read only memory (ROM) 204, and/or storage device 206. Additionally or alternatively, the code segments may be downloaded via computer networks, such as network 212.

Computer system 200 adapted for use according to an embodiment of the present invention may comprise a general purpose processor-based system configurable with program code (e.g., including the aforementioned code segments) to provide functionality as described herein. Accordingly, computer system 200 of the illustrated embodiment includes central processing unit (CPU) 201 coupled to system bus 202. CPU 201 may be any general purpose CPU, such as a processor from the PENTIUM or CORE family of processors available from Intel Corporation or a processor from the POWERPC family of processors available from the AIM alliance (Apple Inc., International Business Machines Corporation, and Motorola Inc.). However, the present invention is not restricted by the architecture of CPU 201 as long as CPU 201 supports the inventive operations as described herein.

Bus 202 of the illustrated embodiment is coupled to RAM 203, such as may comprise SRAM, DRAM, SDRAM, flash memory, and/or the like. ROM 204, such as may comprise PROM, EPROM, EEPROM, and/or the like, is also coupled to bus 202 of the illustrated embodiment. RAM 203 and ROM 204 hold user and system data and programs as is well known in the art. Bus 202 is also coupled to input/output (I/O) controller 205, communications adapter 211, user interface adapter 208, and display adapter 209.

I/O controller 205 connects to storage device 206, such as may comprise one or more of a hard disk, an optical disk (e.g., compact disk (CD) or digital versatile disk (DVD)), a floppy disk, and a tape, to the computer system. I/O controller 205 of the illustrated embodiment is also connected to printer 214, which would allow the system to print information such as documents, photographs, etc. Such a printer may be a traditional printer (e.g. dot matrix, laser, etc.), a fax machine, a copy machine, and/or the like.

Communications adapter 211 is adapted to couple computer system 200 to network 212 to provide communications to and/or from external systems, devices, networks, etc. Network 212 may comprise the public switched telephone network (PSTN), a local area network (LAN), a metropolitan area network (MAN), a wide area network (WAN), an extranet, an intranet, the Internet, a cellular network, a cable transmission network, and/or the like.

User interface adapter 208 of the illustrated embodiment couples various user input devices to the computer system. For example, keyboard 213, pointing device 207, and microphone 216 may be coupled through user interface adapter to accept various forms of user input. Similarly, speakers 215 may be coupled through user interface adapter to provide user interface output.

Display adapter 209 provides an interface to display 210. Accordingly, CPU 201 may control display of various information, including text, graphics, and images upon display 210 through display adapter 209. Display 210 may comprise a cathode ray tube (CRT) display, a plasma display, a liquid crystal display (LCD), a projector, and/or the like. Although not expressly shown in the illustrated embodiment, display 210 may provide for input of data as well as output of data. For example, display 210 may comprise a touch screen display according to embodiments of the invention.

Figure 2:
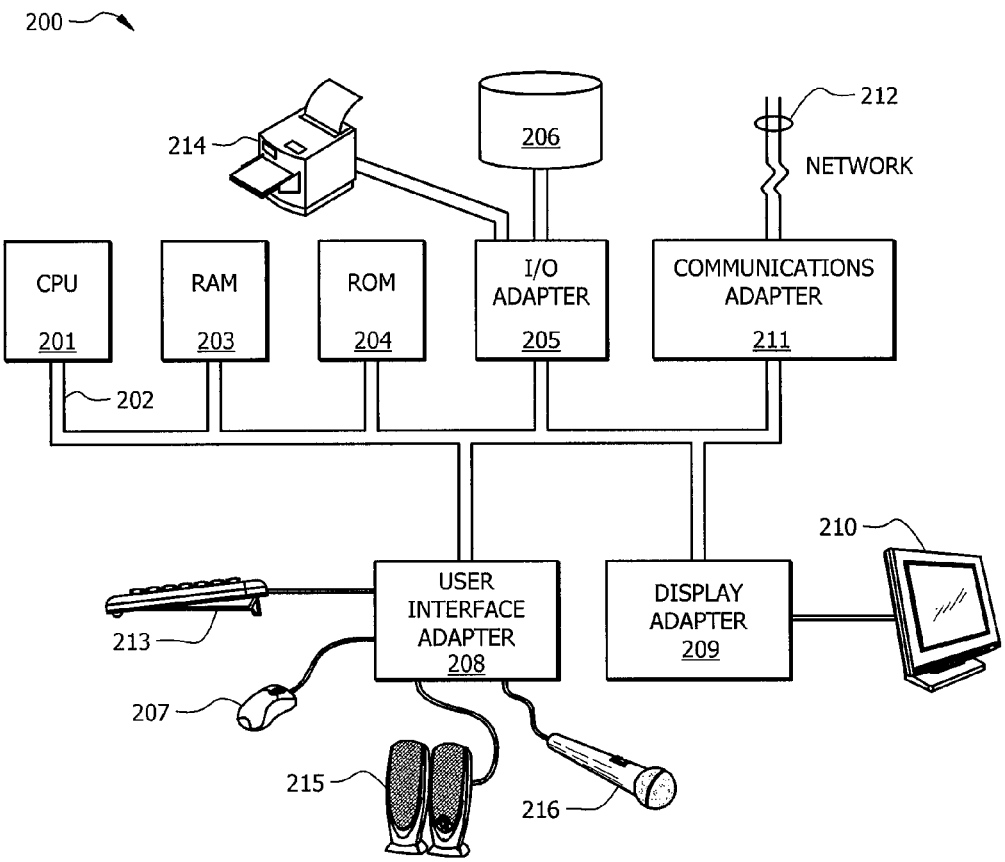
FIG. 2 shows a computer system adapted for use according to an embodiment of the present invention.

Although illustrated as a general purpose processor-based system in FIG. 2, it should be appreciated that a processor-based system adapted to provide depth analysis logic 110, global depth map generation logic 120, and depth fusion logic 130, or portions thereof, may comprise a special purpose processor-based system, such as may provide hardware logic circuits to implement the foregoing functionality. For example, some or all of the foregoing logic may be implemented in an application specific integrated circuit (ASIC) or field programmable gate array (FPGA) according to embodiments of the invention.

Referring again to FIG. 1, as described above, system 100 of the illustrated embodiment comprises depth analysis logic 110, global depth map generation logic 120, and depth fusion logic 130 cooperating to accept input of image data 101 and generate image depth map 102. Image data 101 may, for example, comprise a series of mono-view images of a scene from a moving video. Correspondingly, image depth map 102 may provide images that contain information relating to the distance of the surfaces of scene objects in the moving video from a particular viewpoint (e.g., the vantage point of the viewer or camera).

Figure 3:
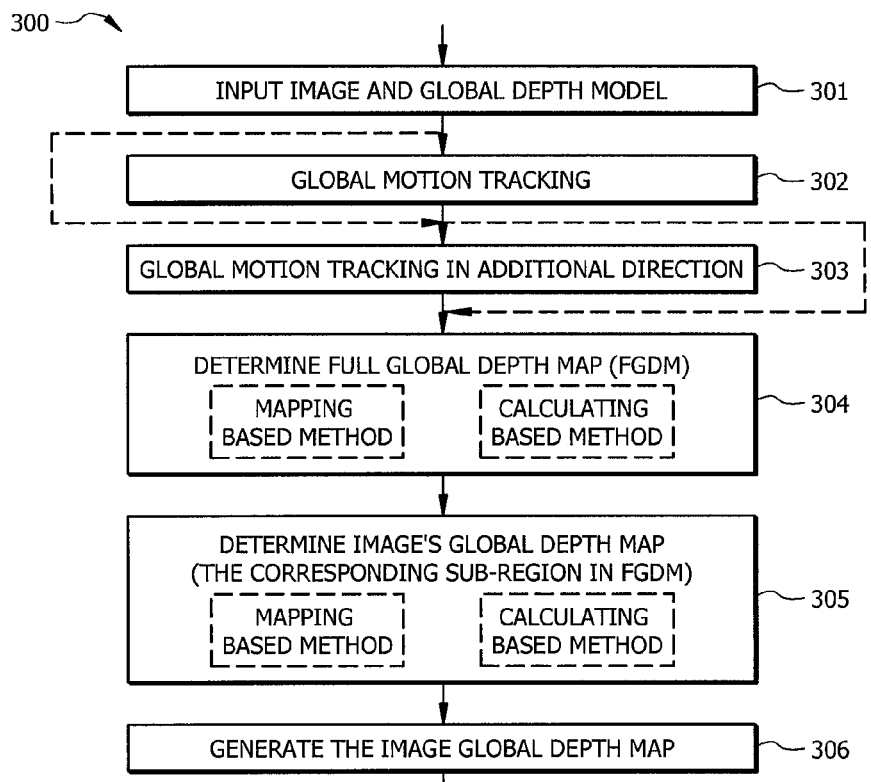
FIG. 3 shows operation of global depth map generation logic in providing image global depth map generation for use in generating an image depth map according to embodiments of the invention.

Detail with respect to operation of global depth map generation logic 120 in providing image global depth map generation for use in generating image depth map 102 according to embodiments of the invention is shown in flow 300 of FIG. 3. It should be appreciated that the functions of flow 300 of the illustrated embodiment may be performed, for example, by code segments implemented as global depth map generation logic 120.

At block 301 of the illustrated embodiment, an image of input image 101 for which an image depth map is to be generated is input to global depth map generation logic 120. For example, where input image 101 comprises a moving video scene, a single color image of the moving video scene may be input to global depth map generation logic 120. It should be appreciated that processing according to flow 300 of embodiments may be performed with respect to each such single image of the moving video scene.

Also at block 301 of the illustrated embodiment, a global depth model for the image is input to global depth map generation logic 120. The global depth model may comprise a global depth model configuration as is well known in the art, such as a planar model, a spherical model, etc., selected for the particular corresponding image input to global depth map generation logic 120.

Global motion with respect to the image content is tracked at block 302 of the illustrated embodiment. For example, global motion of the image may be tracked in the horizontal and vertical directions according to embodiments of the invention. Global motion tracking in the horizontal and vertical directions according to embodiments herein may utilize analysis of changes in luminance in the center area of the image, as described in detail with reference to FIGS. 4 and 5 below. Irrespective of the particular techniques utilized, global motion tracking provided according to embodiments of the invention preferably tracks general movement of the image, such as due to panning of the camera, general movement of the object groupings within the image, etc., rather than tracking the movement of a particular individual object within the image. Accordingly, global motion tracking may be utilized according to embodiments to locate or map the image to a corresponding portion of a full global depth map (FGDM) for generation of an image global depth map (IGDM) herein.

At block 303 of the illustrated embodiment global motion with respect to the image content is further tracked, such as to provide global motion tracking in an additional direction. For example, where global motion tracking is provided in the horizontal and vertical directions at block 302, global motion tracking at block 303 may be provided in the Z direction (i.e., the direction orthogonal to the image plane). Global motion tracking in the Z direction according to embodiments herein may utilize analysis of changed of a saliency area size in the center area of the image, as described in detail with reference to FIGS. 6 and 7 below. As with the global motion tracking provided at block 302, global motion tracking provided at block 303 of embodiments herein preferably tracks general movement of the image, such as due to zooming in and/or zooming out the camera, etc., rather than tracking the movement of a particular individual object within the image.

It should be appreciated that operation as illustrated in flow 300 includes functionality that is optionally implemented depending upon the particular circumstances of the implementation. As will be described in further detail below, embodiments herein may implement various techniques (e.g., mapping based or calculating based) for generating a FGDM and for generating an IGDM from the FGDM by global depth map generation logic 120. Accordingly, where the particular techniques implemented do not utilize a particular function, such as the global motion tracking of block 302 and/or the global motion tracking of block 303, that functionality may be omitted from the operation of global depth map generation logic 120 (as indicated by the dotted arrows providing processing flows around block 302 and block 303), if desired. It should be appreciated, however, that global motion tracking as provided at block 302 may nevertheless be utilized by embodiments implementing both mapping based and calculating based techniques. For example, embodiments of mapping based and calculating based techniques herein utilize global motion tracking in the horizontal and vertical directions (block 302) and embodiments of calculating based techniques herein utilize global motion tracking in the Z direction (block 303).

At block 304 of the illustrated embodiment a FGDM is generated. The FGDM of embodiments of the invention comprises a global depth map which is larger than or equal to the image for which 2D-to-3D conversion is to be provided in order to accommodate image global motion (e.g., motion within an image which does not amount to a scene change). For example, the FGDM may comprise a global depth map corresponding to a scene of a motion video (i.e., corresponding to a series of images forming the scene), and thus sized to accommodate the global motion of each image of the scene.

As shown in block 304 of the illustrated embodiment, various techniques may be utilized to generate a FGDM herein, such as a mapping based technique or a calculating based technique. A mapping based technique as may be utilized to generate a FGDM according to embodiments may comprise utilization of a pre-generated FGDM, as discussed in detail with reference to FIGS. 9A-9D below. A calculating based technique as may be utilized to generate a FGDM according to embodiments may comprise utilization of global motion information to stretch or shrink a FGDM according to the global motion detected within the image, as discussed in detail with reference to FIGS. 8A-8D below.

At block 305 of the illustrated embodiment the IGDM is determined using the FGDM. The IGDM of embodiments of the invention comprises a global depth map which is the size of the image for which 2D-to-3D conversion is to be provided and which may be used with various depth refining techniques in generating an image depth map herein. It should be appreciated that, due to the analysis performed (e.g., FGDM sub-region selection, such as using motion tracking) according to embodiments herein, the IGDM provides a global depth map which is more accurate to the image than the global depth models traditionally utilized in depth map generation.

As with block 304 above, block 305 of the illustrated embodiment illustrates that various techniques may be utilized to determine an IGDM herein, such as the aforementioned mapping based technique or calculating based technique. In operation of a mapping based technique of embodiments, a mapping area for the IGDM may be determined within the FGDM, as discussed in detail with reference to FIGS. 9A-9D below. In operation of a calculating based technique of embodiments, a calculating area for the IGDM may be determined within the FGDM, as discussed in detail with reference to FIGS. 8A-8D below.

At block 305 of the illustrated embodiment the IGDM is generated. For example, where a mapping based technique is being utilized, a sub-region within the FGDM may have been identified as the IGDM for the current image and thus the IGDM generated from this sub-region. Where a calculating based technique is being utilized, a sub-region within the FGDM may have been identified as the IGDM for the current image and the global depth model may be utilized to calculate the IGDM for that sub-region. The IGDM generated by global depth map generation logic 120 in accordance with flow 300 described above may be provided to depth fusion logic 130, along with local depth adjustment information generated by depth analysis logic 110, for generating image depth map 102 according to embodiments herein.

Figure 4:
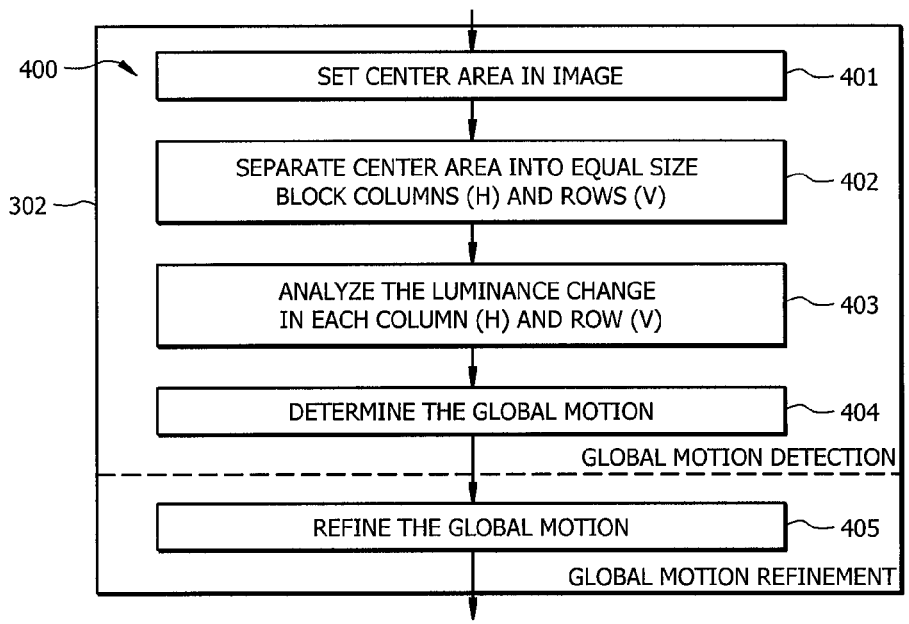
FIG. 4 shows operation of global depth map generation logic to provide global motion tracking functionality in providing image global depth map generation according to embodiments of the invention.

Detail with respect to operation of global depth map generation logic 120 to provide global motion tracking functionality (e.g., as provided at block 302 of FIG. 3) in providing image global depth map generation according to embodiments of the invention is shown in flow 400 of FIG. 4. It should be appreciated that the functions of flow 400 of the illustrated embodiment may be performed, for example, by code segments implemented as global depth map generation logic 120.

Figure 5:
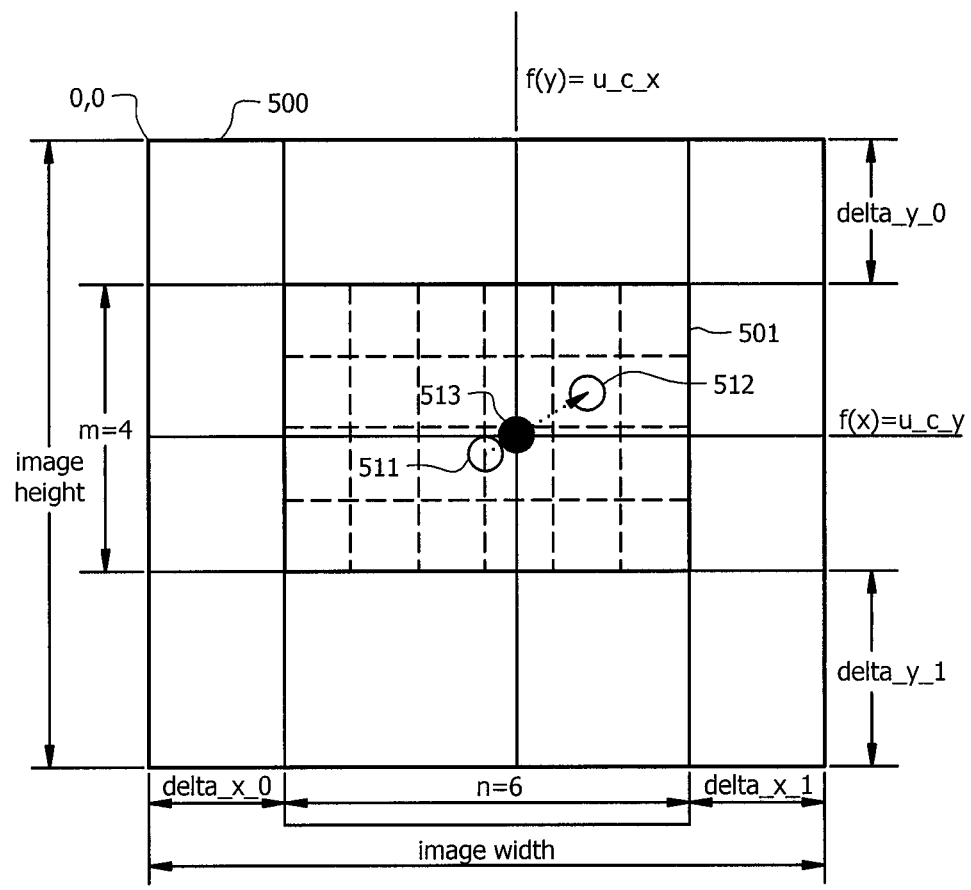
FIG. 5 illustrates determining global motion within in image in accordance with embodiments of the invention.

At block 401 of the illustrated embodiment the center area of the image for which an image depth map is to be generated is set. For example, the center area of a single color image of a moving video scene may be set. FIG. 5 shows center area 501 set within image 500. The height and width of the center area (shown here as center height=image height−delta_y_0−delta_y_1 and center width=image width−delta_x_0−delta_x_1) may be selected as some percentage or relative portion of the overall image height and width, such as based upon the global movement within the image expected/detected, the image content, the global depth model used, etc.

Having set the center area of the image, at block 402 of the illustrated embodiment the center area is separated into sub-areas. For example, the center area may be separated into equal size blocks forming columns and rows. Center area 501 of the embodiment illustrated in FIG. 5 is separated into 6 columns and 4 rows.

At block 403 of the illustrated embodiment, global depth map generation logic 120 analyses the luminance change in each column and each row. For example, the statistic counts of pixels which have large luminance changes (e.g., larger than a pre-defined threshold) with the adjacent pixels for each block row and each block column may be determined to detect changes in the luminance of the image.

At block 404 of the illustrated embodiment the image global motion is determined using the detected luminance change information. For example, the global motion in the horizontal direction may be tracked through finding the block column of the center area with the minimum statistics counts of the luminance change. Similarly, the global motion in vertical direction may be tracked through finding the block row of the center area with the maximum statistics counts of the luminance change. If more than one minimum columns or maximum rows are detected, the one closest to the image center will be chosen according to embodiments of the invention.

As an example of the above global motion determination operation, the global center point for a previous image in the scene may have been determined to be at position (c_x, c_y) as denoted by center point 511. Using the foregoing analysis of luminance change the updated global center point for the image may be determined to be at position (u_c_x, u_c_y) as denoted by updated center point 512. A vector from the center point (e.g., center point 511) to the updated center point (e.g., updated center point 512) represents the global motion of the image.

Although the foregoing operation determines image global motion as may be utilized for image global depth map generation in accordance with the concepts herein, embodiments provide further refinement of the global motion determination. Accordingly, block 405 of the illustrated embodiment refines the image global motion as determined at block 404, such as to maintain temporal consistency, to avoid the effects caused by erroneous global motion detection, etc. For example, the image global motion determined at block 404 may be refined by thresholds, which means the absolute difference of u_c_x and c_x and the absolute difference of u_c_y and c_y should be less than pre-defined or auto-generated thresholds, at block 405.

Continuing with the foregoing example, the updated global center point determined to be at position (u_c_x, u_c_y) as denoted by updated center point 512 may be refined to be at position (r_c_x, r_c_y) as denoted by refined center point 513. A vector from the center point (e.g., center point 511) to the refined center point (e.g., refined center point 513) may thus represent the global motion of the image as tracked in block 302 of FIG. 3 by global depth map generation logic 120.

Figure 6A:
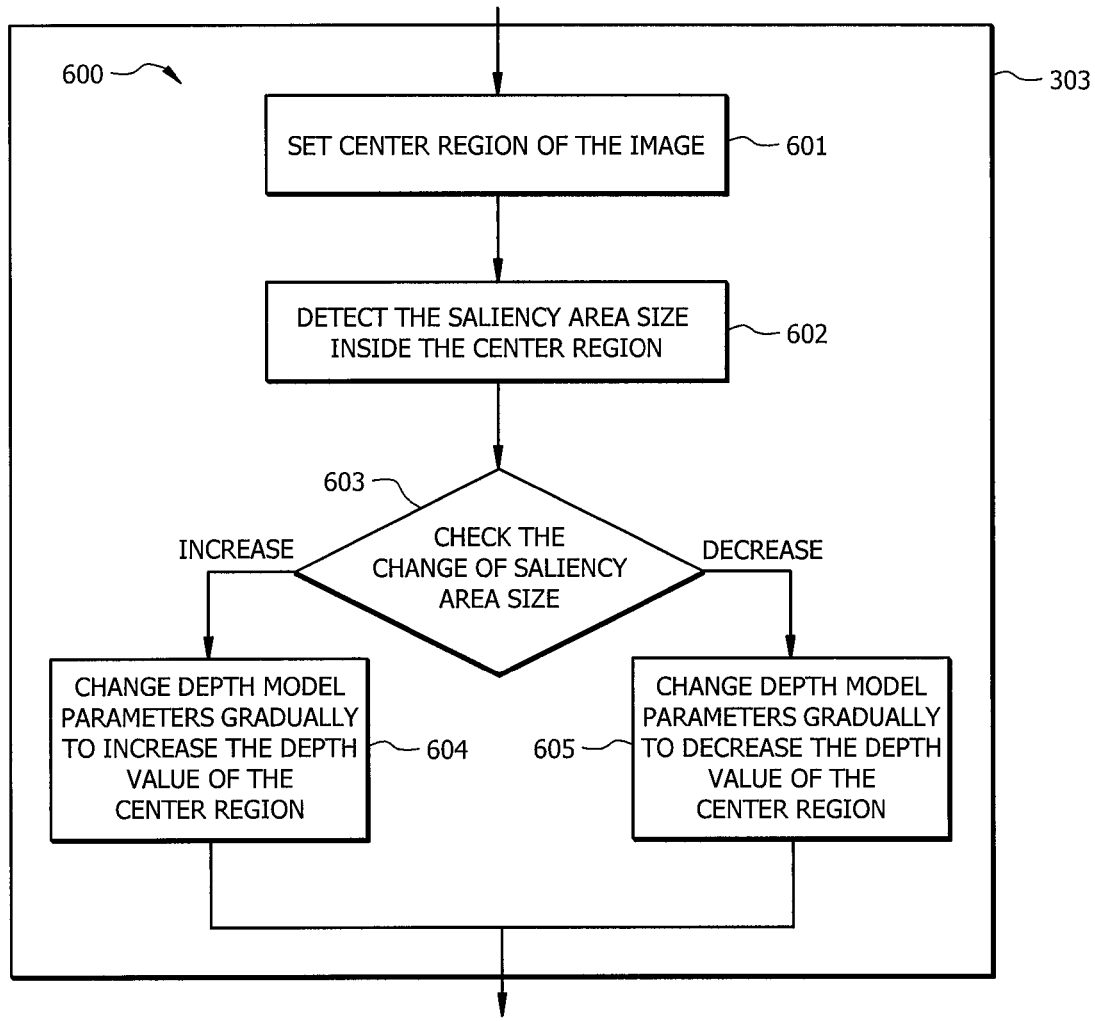
FIGS. 6A and 6B show operation of global depth map generation logic to provide global motion tracking in an additional direction according to embodiments of the invention.

Detail with respect to operation of global depth map generation logic 120 to provide global motion tracking (e.g., as provided at block 303 of FIG. 3) in an additional direction (e.g., providing global motion tracking in the Z direction), as may be used to enhance 3D effect and 3D image rendering according to embodiments is shown in flow 600 of FIG. 6A. It should be appreciated that the functions of flow 600 of the illustrated embodiment may be performed, for example, by code segments implemented as global depth map generation logic 120.

Figure 7:
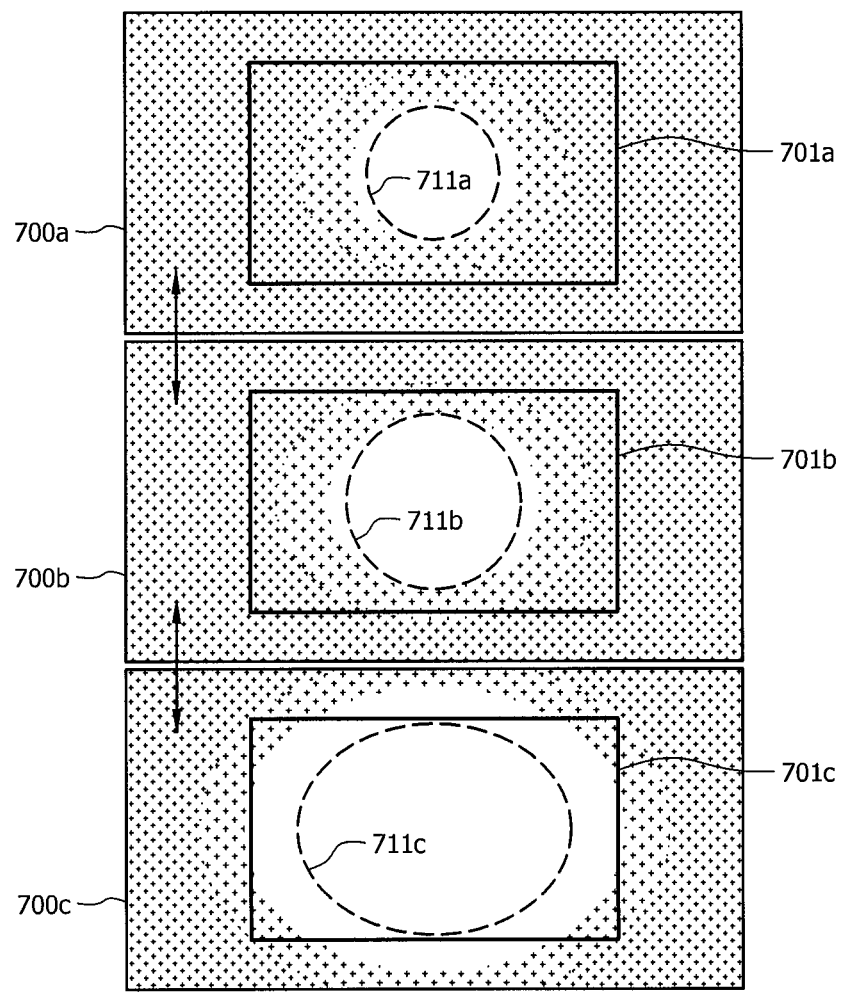
FIG. 7 illustrates determining global motion within an image in accordance with embodiments of the invention.
Figure 9D:
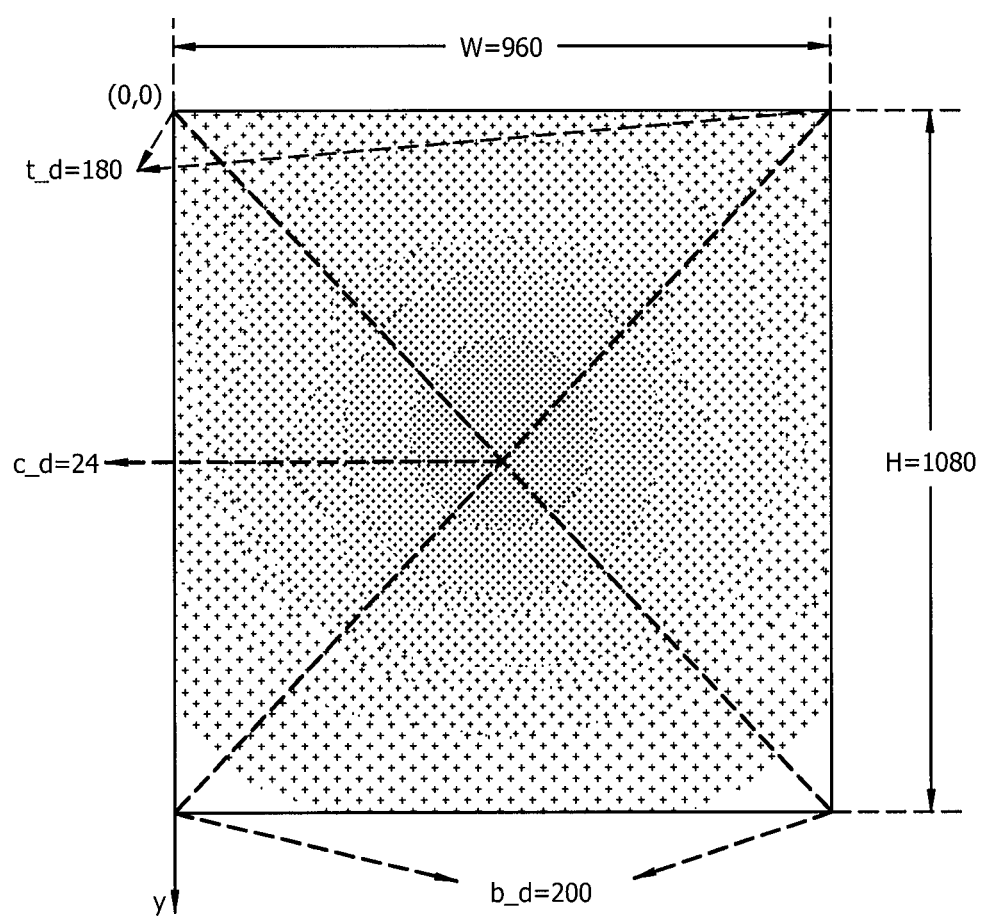

At block 601 of the illustrated embodiment the center region of the image for which an image depth map is to be generated is set. For example, the center region of a single color image of a moving video scene may be set. FIG. 7 shows center region 701 set within image 700 (i.e., center region 701a set in image 700a representing image 700 having a relatively small saliency area size, center region 701b set in image 700b representing image 700 having a relatively medium saliency area size, and center region 701c set in image 700c representing image 700 having a relatively large saliency area size). The height and width of the center region may be selected as some percentage or relative portion of the overall image height and width, such as based upon the global movement within the image expected/detected, the image content, the global depth model used, etc.

Having set the center region of the image, at block 602 of the illustrated embodiment the size of a saliency area within the center region is detected. Global depth map generation logic 120 of embodiments may analyze the frequency and spatial information to detect a change in size of the saliency area. For example, the image for which an image depth map is currently being generated may be compared to a previous and/or subsequent image from the scene to detect changes in the frequency and spatial domain of the image to detect a change in the size of the saliency area.

At block 603 of the illustrated embodiment a determination is made as to whether a change in the size of the saliency area is indicated by the detected saliency area size. For example, the saliency area of the current image may have changed from the relatively small saliency area size of saliency area 711a to the relatively medium saliency area size of saliency area 711b. Conversely, the saliency area of the current image may have changed from the relatively medium saliency area size of saliency area 711b to the relatively small saliency area size of saliency area 711a. Similarly, the saliency area of the current image may have changed from the relatively medium saliency area size of saliency area 711b to the relatively large saliency area size of saliency area 711c. Conversely, the saliency area of the current image may have changed from the relatively large saliency area size of saliency area 711c to the relatively medium saliency area size of saliency area 711b.

If the saliency area size is determined to have increased (e.g., saliency area 711a to saliency area 711b or saliency area 711b to saliency area 711c) at block 603, processing according to the illustrated embodiment proceeds to block 604. At block 604 of the illustrated embodiment the global depth model's parameters are changed (e.g., the parameters of the depth model for calculating the FGDM are changed) to make sure the depth value of the center area of the FGDM is increased compared with the depth value of the center area of the previous or subsequent image's FGDM in correspondence with the image view having moved (e.g., zoomed in). In operation according to embodiments, all the parameters changing step size are constrained by thresholds. Such thresholds may be utilized to ensure that the depth value of current image's FGDM is not changed too much compared with the previous/subsequent image's FGDM. The step of changing the parameters is constrained, according to embodiments, by thresholds to keep the FGDM temporal consistent and avoid FGDM sudden changing caused by saliency area error detection.

If, however, the saliency area size is determined to have decreased (e.g., saliency area 711c to saliency area 711b or saliency area 711b to saliency area 711a) at block 603, processing according to the illustrated embodiment proceeds to block 605. At block 605 of the illustrated embodiment the global depth model's parameters are changed to make sure the depth value of the center area of FGDM is decreased compared with depth value of the center area of the previous or subsequent image's FGDM in correspondence with the image view having moved (e.g., zoom out). As discussed above, all the parameters changing step size are constrained by thresholds according to embodiments of the invention.

Figure 6B:
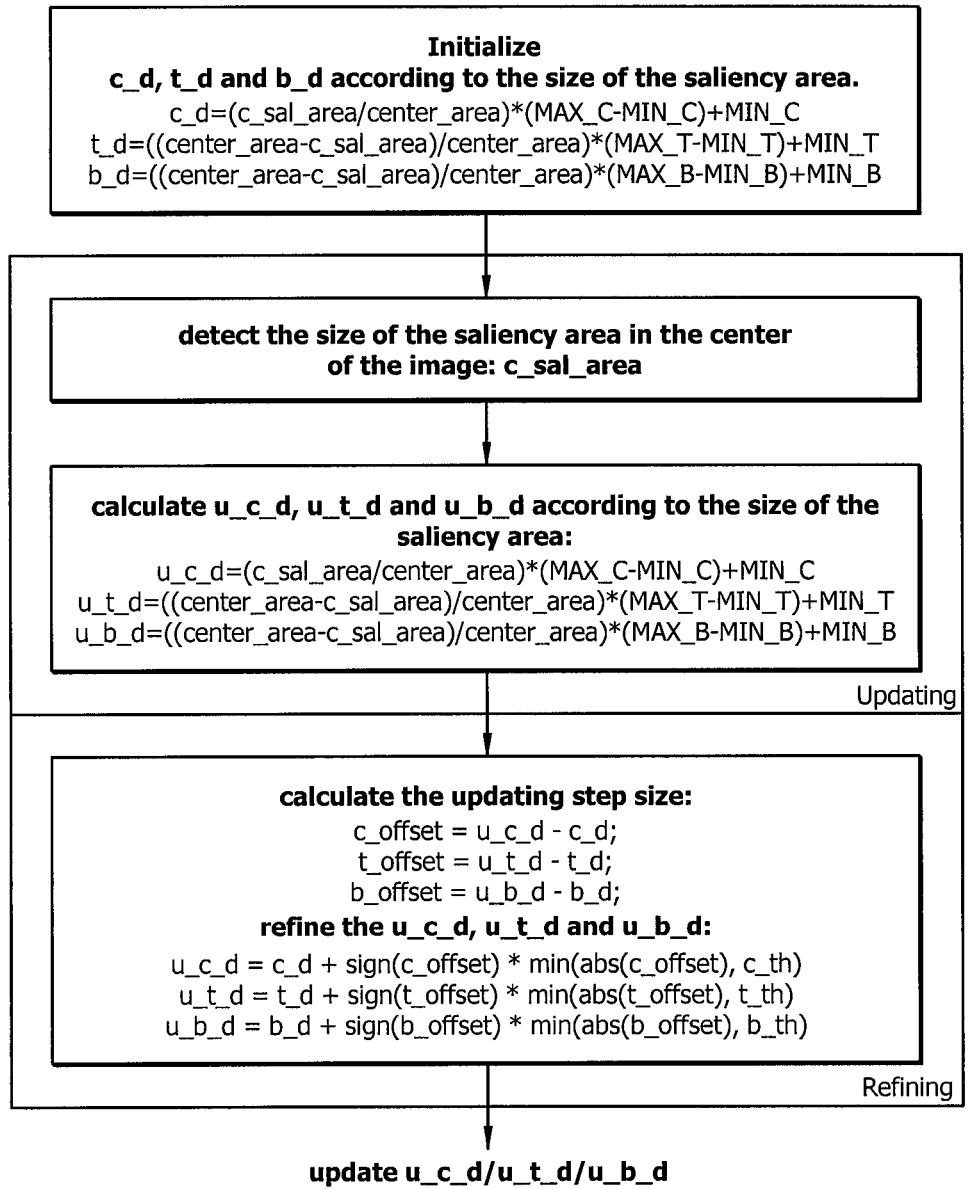

FIG. 6B shows exemplary operation of global depth map generation logic 120 to modify the parameters of sphere model to change the FGDM based on saliency area detection consistent with the foregoing. It should be appreciated that in the exemplary embodiment of FIG. 6B, in implementing the depth model parameter changes to increase the depth value of the center region (e.g., block 604 of FIG. 6A), u_c_d>c_d (increased) and u_t_d<t_d && u_b_d<b_d (decreased) Likewise, in implementing the depth model parameter changes to decrease the depth value of the center region (e.g., block 605 of FIG. 6A), u_c_d<c_d (decreased) and u_t_d>t_d && u_b_d>b_d (increased).

The global depth model, as changed at either bock 604 or 605 to correspond with the image view having moved, may therefore more closely represent the image being processed. Global depth map generation logic 120 thus use this global depth model in generating the FGDM and IGDM used to provide generation of an image depth map which more accurately represents the local depth discontinuity within image.

FIGS. 8A-8D illustrate operation of global depth map generation logic 120 implementing a calculating based technique for generating a FGDM and for generating an IGDM from the FGDM (e.g., blocks 304 and 305 of FIG. 3) according to embodiments of the invention. In particular, FIGS. 8A-8D show stretching (FIGS. 8A and 8C) and shrinking (FIGS. 8B and 8D) the FGDM in association with 4 different global motion directions, wherein the respective detected global motion directions are indicated by arrows 801a-801d.

In operation according to the illustrated embodiments, the FGDM is stretched or shrunk in different size and direction according to the global motion to make the updated center point position to be the center of the updated FGDM. For example, in the example of FIG. 8A, the global motion direction detected in association with movement of center point 811a (position c_c_x, c_c_y) to center point 812a (position u_c_x, u_c_y) stretches previously calculated FGDM 821a (e.g., calculated from the global depth model, as may have been stretched or shrunk in accordance with global movement in other images of the scene) having center point 811a to FGDM 822a having center point 812a. In the example of FIG. 8B, the global motion direction detected in association with movement of center point 811b (position c_c_x, c_c_y) to center point 812b (position u_c_x, u_c_y) shrinks previously calculated FGDM 822b having center point 811b to FGDM 821b having center point 812b. In the example of FIG. 8C, the global motion direction detected in association with movement of center point 811c (position c_c_x, c_c_y) to center point 812c (position u_c_x, u_c_y) stretches previously calculated FGDM 821c having center point 811c to FGDM 822c having center point 812c. In the example of FIG. 8D, the global motion direction detected in association with movement of center point 811d (position c_c_x, c_c_y) to center point 812d (position u_c_x, u_c_y) stretches previously calculated FGDM 822d having center point 811d to FGDM 821d having center point 812d.

As can be appreciated from the foregoing, the FGDM size will be larger or equal to image size according to embodiments herein. However, only the depth values for positions in a sub-region of the updated FGDM corresponding to the current image are calculated according to embodiments of the invention. Accordingly, embodiments of global depth map generation logic 120 operates to determine a sub-region of the FGDM corresponding to the current image, whereby the identified FGDM sub-region is selected as the IGDM for use in calculating an image depth map.

For example, the following calculations may be utilized for identifying the sub-region within the FGDM. Derive the (c_x, c_y) of the new FGDM according to the updated coordinate (u_c_x, u_c_y). If u_c_y is less than half of the image height, the image should correspond to the bottom sub-region of the FGDM (If u_c_y<img_height/2, =>u_h=(img_height−u_c_y)*2=>c_y=u_h/2). Otherwise, the image should correspond to the top sub-region of the FGDM (If u_c_y>img_height/2, =>u_h=u_c_y*2=>c_y=u_h/2). If u_c_x is less than half of the image width, the image should correspond to the right sub-region of the FGDM (if u_c_x<img_width/2, =>u_w=(img_width−u_c_x)*2=>c_x=u_w/2). Otherwise, the image should correspond to the left sub-region of the FGDM (if u_c_x>img_width/2, =>u_w=u_c_x*2=>c_x=u_w/2).

Using calculations, such as those of the exemplary embodiment above, global depth map generation logic 120 operates to determine a sub-region of the FGDM corresponding to the current image. For example, sub-region 831a may be selected as the IGDM from FGDM 822a, sub-region 831b may be selected as the IGDM from FGDM 821b, sub-region 831c may be selected as the IGDM from FGDM 822c, and sub-region 831d may be selected as the IGDM from FGDM 821d. The global depth value for each position in the image may be calculated using the corresponding sub-region according to the updated parameters c_x, c_y, c_d, t_d, b_d and the predefined formula.

FIGS. 9A-9D illustrate operation of global depth map generation logic 120 implementing a mapping based technique for generating a FGDM and for generating an IGDM from the FGDM (e.g., blocks 304 and 305 of FIG. 3) according to embodiments of the invention. In particular, FIGS. 9A-9D show mapping the IGDM from the FGDM.

In operation according to embodiments, the FGDM may be pre-generated using techniques, such as deriving the global depth map model based on scene analysis (wherein the model is an input parameter for operation of global depth map generation logic of embodiments of the invention), to generate a FGDM for the scene of which the image is a part and is thus larger than or equal to the size of the image. For example, after scene analysis and the deriving the global depth map model, by using the conventional techniques, the global depth map with width equal to image width and height equal to image height is generated according to the model. In operation of embodiments of the present invention, the FGDM may be generated with the width equal to (image_width+delta_w) and the height equal to (image_height+delta_h), and delta_w>=0, delta_h>=0. In order to derive the larger FGDM, the parameters for the model (sphere, planar or others) should be changed.

The following provides exemplary embodiment parameters and model (formula) for calculating a FGDM. The parameters utilized may, for example, comprise c_x (horizontal coordinator of the depth map center (W/2)), c_y (vertical coordinator of the depth map center (H/2)), c_d (depth value of the depth map center), t_d (depth value of the top left pixel and the top right pixel in the depth map), and b_d (depth value of the bottom left pixel and bottom right pixel in the depth map), as represented by the embodiment illustrated in FIG. 9D. A formula for generating depth value at position (x, y) may, for a two sphere global depth model, be expressed as:

$$\text{delta}\_x = x - c\_x, \text{delta}\_y = y - c\_y; \text{dis}\_\max = \text{sqrt}(c\_x * c\_x + c\_y * c\_y) \quad (1)$$

$$\text{top}\_d = (\text{delta}\_x * \text{delta}\_x + \text{delta}\_y * \text{delta}\_y) / (\text{dis}\_\max * \text{dis}\_\max) * (t\_d - c\_d) + c\_d \quad (2)$$

$$\text{bot}\_d = (\text{delta}\_x * \text{delta}\_x + \text{delta}\_y * \text{delta}\_y) / (\text{dis}\_\max * \text{dis}\_\max) * (b\_d - c\_d) + c\_d \quad (3)$$

The two sphere models may be fused together according to the pixel position in vertical direction as represented below:

$$\text{alpha} = c\_y > y ? (c\_y - y)/(H/2) : 0 \quad (4)$$

Such that:

$$\text{FGDM}(x,y) = (\text{int})(\text{alpha} * \text{top}\_d + (1.0 - \text{alpha}) * \text{bot}\_d).$$

Irrespective of the particular way in which the FGDM is generated, embodiments of global depth map generation logic 120 implementing a mapping based technique generate an IGDM from the FGDM by mapping the IGDM from a sub-region of the FGDM. For example, a global depth map may be obtained by shifting the corresponding image sub-region inside the FGDM to make the updated coordinate (u_c_x, u_c_y) in image coordinate system to be the center of the FGDM. Accordingly, the IGDM of embodiments is mapped to a sub-region of the FGDM according to the global motion detected in the image. As shown in FIG. 9A, FGDM 900 is larger than the image size (represented by the size of IGDM 901 mapped into the FGDM in association with a previously processed image), and thus is adapted to accommodate global motion of the images within a scene. The global motion detected with respect to the current image in the exemplary embodiment illustrated in FIG. 9A is to the left and up. Thus, IGDM 902 for the current image is offset from IGDM 901 for the previous image within the scene to the right and bottom (offset horizontally by (c_c_x−u_c_x) and vertically by (c_c_y−u_c_y)). That is, the sub-region selected for the IGDM for the image currently being processed is shifted in a direction according to the global motion to get the image global depth map. As can be appreciated from the global depth map representations of FIGS. 9B and 9C, IGDM 902 generated for the current image from FGDM 900 is adjusted, as compared to IGDM 901, for the image currently being processed based upon the global movement detected.

Figure 10:
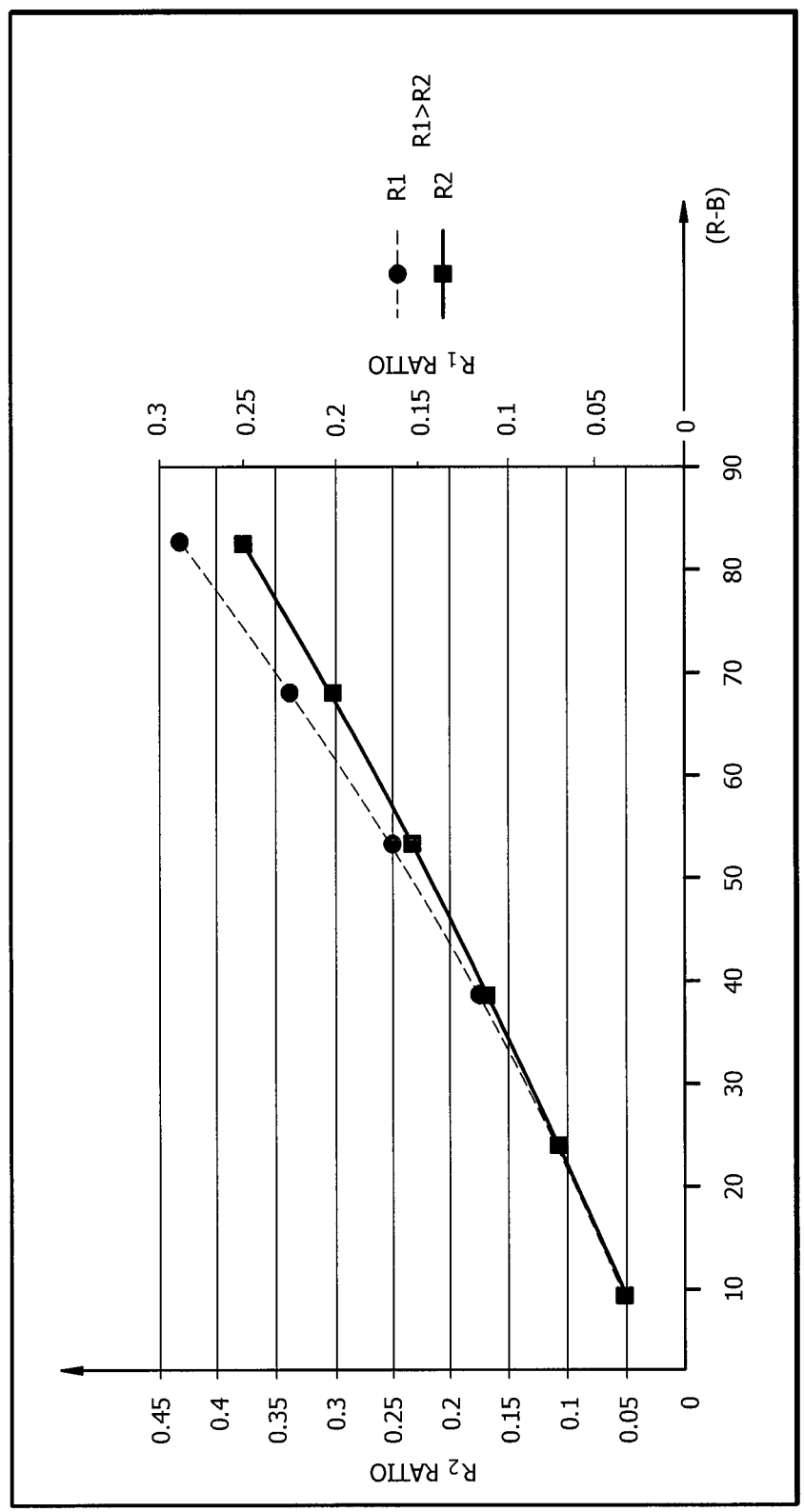
FIG. 10 shows operation of depth analysis logic in providing localized image depth information for use in generating an image depth map according to embodiments of the invention.

Detail with respect to operation of depth analysis logic 110 in providing localized image depth information for use in generating image depth map 102 according to embodiments of the invention is shown in FIG. 10. It should be appreciated that functionality provided as represented in FIG. 10 of the illustrated embodiment may be performed, for example, by code segments implemented as depth analysis logic 110.

In providing localized depth map refinement, embodiments of depth analysis logic 110 utilize a relative relation between color components to adjust the local depth map and improve the 3D visual perception. For example, assume that R and B are two different color components in a color space, where R represent the warm pigment and B represents the cool pigment. Local depth map adjustment metrics may be generated by depth analysis logic 110, using a relative relation of the R and B color components, for use with respect to the foregoing IGDM in generating image depth map 102 by depth fusion logic 130. In operation according to embodiments, the local depth adjustment will be made only for the pixels with the value of R color component larger than the value of B color component. The local depth adjustments implemented according to embodiments herein will be proportional to the relative relation between the color components. For example, for the pixels with the same R color component, the adjustment ratio implemented according to embodiments will be in direct ratio with the difference between R and B. For the pixels with the same difference between R and B, the adjustment ratio implemented according to embodiments will be in inverse ratio with the value of R color component.

The graph of FIG. 10 illustrates defining the relative relation between R and B by ratio for use in localized depth map refinement according to embodiments herein, wherein R1 and R2 shown in FIG. 10 are different values of R color components. The relative relationship between the color components may be quantized as a ratio computed, for example, according to the following equation:

$$\text{Ratio} = (R - B)/(R + B)$$

$$\text{where, } (R >= B), \text{ and}(R + B) != 0. \quad (5)$$

R1 and R2 in the FIG. 10 show that for the pixels with the same difference between R and B, the adjustment ratio implemented according to embodiments will be in inverse ratio with the value of R color component. That means, if R1>R2, and (R1−B1)==(R2−B2), then the ratio value ratio 1 calculated by R1 should be less than the ratio value ratio 2 calculated by R2.

Depth analysis logic 110 of embodiments herein may utilize such ratios representing the relative relationship between color components through various techniques to refine depth values in a depth map corresponding to the respective pixels. For example, a refining technique utilizing such ratios may operate to compute a depth adjustment constraining metric, m_ratio, as m_ratio=1.0+k*Ratio, where 0<k<=1, used to constrain the refining step size such that local_depth=local_depth*m_ratio. Alternatively, a refining technique utilizing such ratios may operate to compute local_depth=local_depth+Ratio*CONST_DEPTH_INCREMENT, where CONST_DEPTH_INCREMENT is a metric used to constrain the refine step size (e.g., CONST_DEPTH_INCREMENT may be an integer value, such as 32).

It should be appreciated that the use of color component relative relation in accordance with embodiments of the invention differs significantly from the techniques heretofore employed for localized depth map refinement. For example, many prior implementations use only a separate color component to derive the local depth map through a heuristic method (e.g., the warm color component used to indicate a near object while the cool color component used to indicate a far object).

Having generated local depth map adjustment metrics by operation of depth analysis logic 110 and generated an IGDM through operation of global depth map generation logic 120, depth fusion logic 130 operates to generate image depth map 102 using these two inputs. For example, depth fusion logic 130 may utilize the local depth map adjustment metrics to adjust the depth values at positions in the IGDM corresponding to their respective pixel positions, thereby refining the IGDM into an image depth map which more accurately represents the local depth discontinuity within the image.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method comprising:
receiving a mono-view image for generating an image depth map of the mono-view image, wherein the mono-view image is part of a plurality of images;
tracking global motion of the mono-view image to provide image global motion information, wherein the global motion comprises general movement of the mono-view image which does not amount to a scene change within a motion video segment, wherein the tracking global motion of the mono-view image comprises tracking global motion in horizontal and vertical directions in the mono-view image, and wherein the tracking global motion in the horizontal and vertical directions comprises:
analyzing luminance change within the mono-view image;
setting a center area within the mono-view image; and
separating the center area into columns and rows of blocks, wherein the analyzing luminance change within the mono-view image comprises: determining a block column with minimum statistics counts of the luminance change for tracking motion in the horizontal direction, and determining a block row with maximum statistics counts of the luminance change for tracking motion in the vertical direction;
generating an image global depth map using the image global motion information; and
refining local depth values of the image global depth map using a relative relation of a plurality of color components for pixels of the mono-view image to provide the image depth map of the mono-view image.

2. The method of claim 1, wherein the tracking global motion in the horizontal and vertical directions further comprises:
refining the image global motion information to maintain temporal consistency.

3. The method of claim 1, wherein the tracking global motion of the mono-view image comprises:
tracking global motion in a direction (Z direction) orthogonal to an image plane of the mono-view image.

4. The method of claim 3, wherein the tracking global motion in the Z direction comprises:
setting a center region within the mono-view image;
detecting a saliency area size within the center region; and
changing parameters of a depth model used in generating the image global depth map in accordance with a change in the saliency area size.

5. The method of claim 1, further comprising:
generating a full global depth map for the plurality of images comprising the motion video segment, wherein the full global depth map is sized to accommodate image global motion within the motion video segment; and
generating the image global depth map from the full global depth map.

6. The method of claim 5, wherein the generating the image global depth map from the full global depth map comprises:
mapping the mono-view image to a sub-region of the full global depth map.

7. The method of claim 5, wherein the generating the image global depth map from the full global depth map comprises:
calculating a sub-region of the full global depth map corresponding to the mono-view image.

8. The method of claim 5, wherein the full global depth map is larger in size than the mono-view image.

9. The method of claim 5, wherein the generating the full global depth map comprises:
pre-generating the full global depth map for use in image depth map generation with respect to the plurality of images comprising the motion video segment.

10. The method of claim 5, wherein the generating the full global depth map comprises:
using the image global motion information to shrink or stretch a global depth model to provide the full global depth map sized to accommodate image global motion.

11. A system comprising:
a memory storing logic implemented by a processor, the logic including:
global depth map generation logic operable to track global motion of a mono-view image to provide image global motion information and generate an image global depth map using the image global motion information, wherein the mono-view image is part of a plurality of images, and wherein the global motion comprises general movement of the mono-view image, wherein the global depth map generation logic operates to:
track global motion in horizontal and vertical directions in the mono-view image;

analyze luminance change within the mono-view image when tracking global motion in the horizontal and vertical directions;

set a center area within the mono-view image and separate the center area into columns and rows of blocks; and determine a block column with minimum statistics counts of the luminance change for tracking motion in the horizontal direction and determine a block row with maximum statistics counts of the luminance change for tracking motion in the vertical direction when tracking global motion in the horizontal and vertical directions;

depth analysis logic operable to determine local depth adjustment metrics using a relative relation of a plurality of color components for pixels of the mono-view image; and depth fusion logic operable to refine local depth values of the image global depth map using the local depth adjustment metrics to provide an image depth map of the mono-view image.

12. The system of claim 11, wherein the global depth map generation logic is operable to track global motion in a direction (Z direction) orthogonal to an image plane of the mono-view image.

13. The system of claim 12, wherein the global depth map generation logic operates to set a center region within the mono-view image, detect a saliency area size within the center region, and change parameters of a depth model used in generating the image global depth map in accordance with a change in the saliency area size when tracking global motion in the Z direction.

14. The system of claim 11, wherein the global depth map generation logic operates to generate a full global depth map for the plurality of images, wherein the full global depth map is sized to accommodate image global motion within the plurality of images, and generate the image global depth map from the full global depth map.

15. The system of claim 14, wherein the global depth map generation logic operates to map the mono-view image to a sub-region of the full global depth map when generating the image global depth map.

16. The system of claim 14 wherein the global depth map generation logic operates to calculate a sub-region of the full global depth map corresponding to the mono-view image when generating the image global depth map.

17. The system of claim 14, wherein the full global depth map is larger in size than the mono-view image.

18. The system of claim 14, wherein the global depth map generation logic operates to use the image global motion information to shrink or stretch a global depth model to provide the full global depth map sized to accommodate image global motion when generating the full global depth map.

19. A method comprising:
receiving a mono-view image for generating an image depth map of the mono-view image, wherein the mono-view image is part of a plurality of images comprising a motion video segment; and tracking global motion of the mono-view image to provide image global motion information, wherein the global motion comprises general movement of the mono-view image, and wherein the tracking global motion of the mono-view image comprises:
tracking global motion in horizontal and vertical directions in the mono-view image;
analyzing luminance change within the mono-view image;
separating a center area of the mono-view image into columns and rows of blocks; and
determining a block column with minimum statistics counts of the luminance change for tracking motion in the horizontal direction and determine a block row with maximum statistics counts of the luminance change for tracking motion in the vertical direction.

20. The method of claim 19, wherein the tracking global motion of the mono-view image further comprises:
tracking global motion in a direction (Z direction) orthogonal to an image plane of the mono-view image.

21. The method of claim 19, further comprising:
generating a full global depth map for the plurality of images comprising the motion video segment, wherein the full global depth map is sized to accommodate image global motion within the motion video segment, and wherein the full global depth map is larger in size than the mono-view image.

22. The method of claim 21, wherein the generating the full global depth map comprises:
pre-generating the full global depth map for use in image depth map generation with respect to the plurality of images comprising the motion video segment.

23. The method of claim 21, further comprising:
generating an image global depth map from a sub-region of the full global depth map using the image global motion information, wherein the image global motion information is used to locate the sub-region of the full global depth map, and wherein the generating the full global depth map comprises:
using the image global motion information to shrink or stretch a global depth model to provide the full global depth map sized to accommodate image global motion.

24. The method of claim 19, further comprising:
refining local depth values of the image global depth map using a relative relation of a plurality of color components of a pixel in pixels of the mono-view image to provide the image depth map of the mono-view image.

* * * * *